US008126913B2

(12) United States Patent
Catucci et al.

(10) Patent No.: US 8,126,913 B2
(45) Date of Patent: Feb. 28, 2012

(54) METHOD TO IDENTIFY EXACT, NON-EXACT AND FURTHER NON-EXACT MATCHES TO PART NUMBERS IN AN ENTERPRISE DATABASE

(75) Inventors: Giacomo J. Catucci, Clinton Corners, NY (US); Robert M. Dunn, Hyde Park, NY (US); Alfredo Fappiano, Torrington, CT (US); Joel K. Popelsky, Highland Mills, NY (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/117,033

(22) Filed: May 8, 2008

(65) Prior Publication Data
US 2009/0282018 A1 Nov. 12, 2009

(51) Int. Cl.
*G06F 7/00* (2006.01)
*G06F 17/30* (2006.01)

(52) U.S. Cl. .................................................. 707/780
(58) Field of Classification Search .................. 707/705, 707/758, 769, 780, 999.005, 999.006
See application file for complete search history.

(56) References Cited

U.S. PATENT DOCUMENTS

| | | | | |
|---|---|---|---|---|
| 6,760,720 | B1* | 7/2004 | De Bellis | 707/706 |
| 6,889,197 | B2* | 5/2005 | Lidow | 705/5 |
| 7,155,427 | B1* | 12/2006 | Prothia et al. | 707/694 |
| 7,660,788 | B1* | 2/2010 | Clark | 707/764 |
| 7,702,675 | B1* | 4/2010 | Khosla et al. | 707/710 |
| 2002/0055981 | A1* | 5/2002 | Spaey et al. | 709/217 |
| 2002/0067358 | A1* | 6/2002 | Casari et al. | 345/440 |
| 2004/0167833 | A1* | 8/2004 | Schickler | 705/28 |
| 2004/0220918 | A1* | 11/2004 | Scriffignano et al. | 707/3 |
| 2006/0179052 | A1* | 8/2006 | Pauws et al. | 707/6 |
| 2007/0094239 | A1* | 4/2007 | Catucci et al. | 707/3 |
| 2007/0162497 | A1* | 7/2007 | Pauws | 707/104.1 |

* cited by examiner

*Primary Examiner* — James Trujillo
*Assistant Examiner* — Marc Somers
(74) *Attorney, Agent, or Firm* — Cantor Colburn LLP; Yuanmin Cai

(57) ABSTRACT

A method of searching for customer part numbers stored in an enterprise database includes creating a set of discrete search strings from a set of supplier part numbers by which a search of the customer part numbers is performed and identifying any exact, non-exact and further non-exact matches between the discrete search strings and the customer part numbers from an output of the search.

19 Claims, 4 Drawing Sheets

FIG. 1

| SUPP. PN FROM RECEIVED LIST | SORTED SUPP. PN IN ENT. DB | EXACT MATCH OR SUPP. PN FROM RECEIVED PN LIST RESULTING IN NON-EXACT MATCH (MATCH BASIS #1) | SUPP. PN FROM RECEIVED PN LIST WHICH ARE HIGHLY SIMILAR TO SUPP. PN STORED IN ENT. DB BUT COULD NOT CAUSE FIND (MATCH BASIS #2) |
|---|---|---|---|
| IRF7413P MAX873BC/D MAX873BCPA | IRF7413P | EXACT MATCH | |
| | MAX873BCSA-T | MAX873BC/D | MAX873BCPA |

10  20  30  40

METHOD TO IDENTIFY EXACT, NON-EXACT AND FURTHER NON-EXACT MATCHES TO PART NUMBERS IN AN ENTERPRISE DATABASE

BACKGROUND OF THE INVENTION

1. Field of the Invention

Aspects of the present invention are directed to a method of identifying part numbers in an enterprise database and, more particularly, to a method of identifying exact, non-exact and further non-exact matches to part numbers in the enterprise database.

2. Description of the Background

Most businesses today manage their supply chain via the use of part numbers which control inventory, ordering, manufacturing, change control, life cycle management and product recalls. Many of these businesses generate their own customer part numbers to coincide with specific supplier part numbers. Both the customer and supplier part numbers are typically stored by the customer in an enterprise database.

Suppliers use electronic communication to inform the customer of a product change, a product discontinuance, a product recall, product pricing, etc. This electronic communication can contain a large number of part numbers to identify the parts that are relevant to the communication. Here, in order for the customer to determine whether or not any of the supplier part numbers are affected, some type of comparison between the received supplier part numbers and supplier part numbers in the enterprise database must be performed.

A problem exists, however, in that the customer may not always store the supplier's part number verbatim. As such, due to the potential mismatch of the supplier's part number and the customer's stored supplier part number, errors may occur in the comparison between the part numbers of the supplier's communication and the part number(s) stored in the customer's enterprise database.

As an example, supplier part numbers may contain characters which are insignificant to the customer and are not always contained in the supplier part number stored by the customer in the enterprise database. For example, a customer might store supplier part number LM393MX in their enterprise database while a supplier communication might reference supplier part number LM393MX-T. In this case, the "–T" represents the shipping method which might not be a concern for the customer.

In another example, a supplier part number may contain a special character (e.g. /or –) which is included in the supplier's electronic communication but not contained in the supplier part number stored in the customer's enterprise database. That is, a customer might store supplier part number M93C56-WM6 as M93C56WM6 in the enterprise database.

A further problem exists in that the supplier's communication may not even mention every part possessed by the customer that is affected by the issue in the communication. That is, the supplier's electronic communication may contain supplier part number STXC12389-PX while the customer's enterprise database contains part numbers STXC12389-PX as well as STXC12389-PY. Here, the supplier might have inadvertently left STXC12389-PY off of their communication list although it may be affected.

A potential solution for these problems includes manually scanning both lists for exact and potential matches. This solution is, in practice, time consuming and prone to human error. Another solution has been to truncate the set of supplier part numbers to do a search in the customer enterprise database based on the truncated part numbers. The drawbacks here are that the customer can potentially get a very large number of search results if the truncation is excessively severe. The large number of search result would then need to be further analyzed. Therefore, it may be seen that this solution is also time consuming and inefficient.

Yet another solution has been for the customer to search for exact supplier part number matches. Here, the solution ignores the fact that a supplier part number entered in the customer's enterprise database is not always exactly the same as the coinciding supplier part number received in the supplier communication. Moreover, the person performing the part number search might not even have a full understanding of the part number nomenclature used by the supplier and will, therefore, tend to make human errors in his/her data inputs.

SUMMARY OF THE INVENTION

In accordance with an aspect of the invention, a method of searching for customer part numbers stored in an enterprise database is provided and includes identifying any matches between supplier part numbers of a set of supplier part numbers and the customer part numbers, creating a set of discrete search strings for each of the supplier part numbers by which a search of the customer part numbers is performed, identifying any exact matches and non-exact matches between the discrete search strings and the customer part numbers from an output of the search, each non-exact match being characterized by a match of each alpha-numeric character of one of the search strings with a subset of each alpha-numeric character of one of the customer part numbers, determining a maximum length of a search string used to identify each of the non-exact matches, and identifying supplier part numbers that are further non-exact matches with respect to the customer part numbers based on the maximum search string length but which could not have been used to identify the customer part numbers.

In accordance with another aspect of the invention, a method of searching for customer part numbers stored in an enterprise database is provided and includes creating a set of discrete search strings from a set of supplier part numbers by which a search of the customer part numbers is performed, identifying any exact matches and non-exact matches between a particular search string and the customer part numbers from an output of the search, each non-exact match being characterized by a match of each alpha-numeric character of the particular search string with at least a subset of each alpha-numeric character of one of the customer part numbers, identifying the maximum length of the search string by which each of the non-exact matches are identified, and identifying further non-exact matches between the truncated search string and the customer part numbers from an output of the search which are at least as long as the maximum length of the search string by which each of the non-exact matches are identified but which could not have been used to identify the customer part numbers.

In accordance with another aspect of the invention, a system configured to identify customer part numbers stored in an enterprise database is provided and includes a receiver configured to receive a supplier part number, a storage unit configured to store the customer part numbers, a controller configured to create a search string from the supplier part number, a processor configured to conduct a search of the customer part numbers based on the search string, and a comparator configured to compare a result of the search with the supplier part numbers so as to identify any exact, non-exact and further non-exact matches between the search string and the customer part numbers, each non-exact match being characterized by a match of each alpha-numeric character of the search string with at least a subset of each alpha-numeric character of one of the customer part numbers, and each further non-exact match being characterized by a match of a subset of each alpha-numeric character of the search string and at least a subset of each alpha-numeric character of one of the customer part numbers.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a chart illustrating a exemplary embodiment of the invention;

DETAILED DESCRIPTION OF THE INVENTION

With reference to FIG. 1, an exemplary parts supplier may forward a supplier parts list 10 to a customer including a notice regarding supplier part numbers IRF7413P, MAX873BC/D and MAX873BCPA, which correspond to part numbers IRF74413P and MAX873BCSA-T in a read-out of an enterprise database 20 of the customer. Here, in accordance with embodiments of the invention, a list 30 including supplier part numbers IRF7413P and MAX873BC/D and a list 40 including supplier part number MAX873BCPA are each returned. The list 30 represents those supplier part numbers that return an exact match or a non-exact match from the part numbers in the enterprise database to a corresponding search string associated with the supplier part numbers while the list 40 represents the supplier part number that returns a further non-exact match from the part numbers in the enterprise database to a corresponding search string associated with the supplier part number.

Figure 2A:
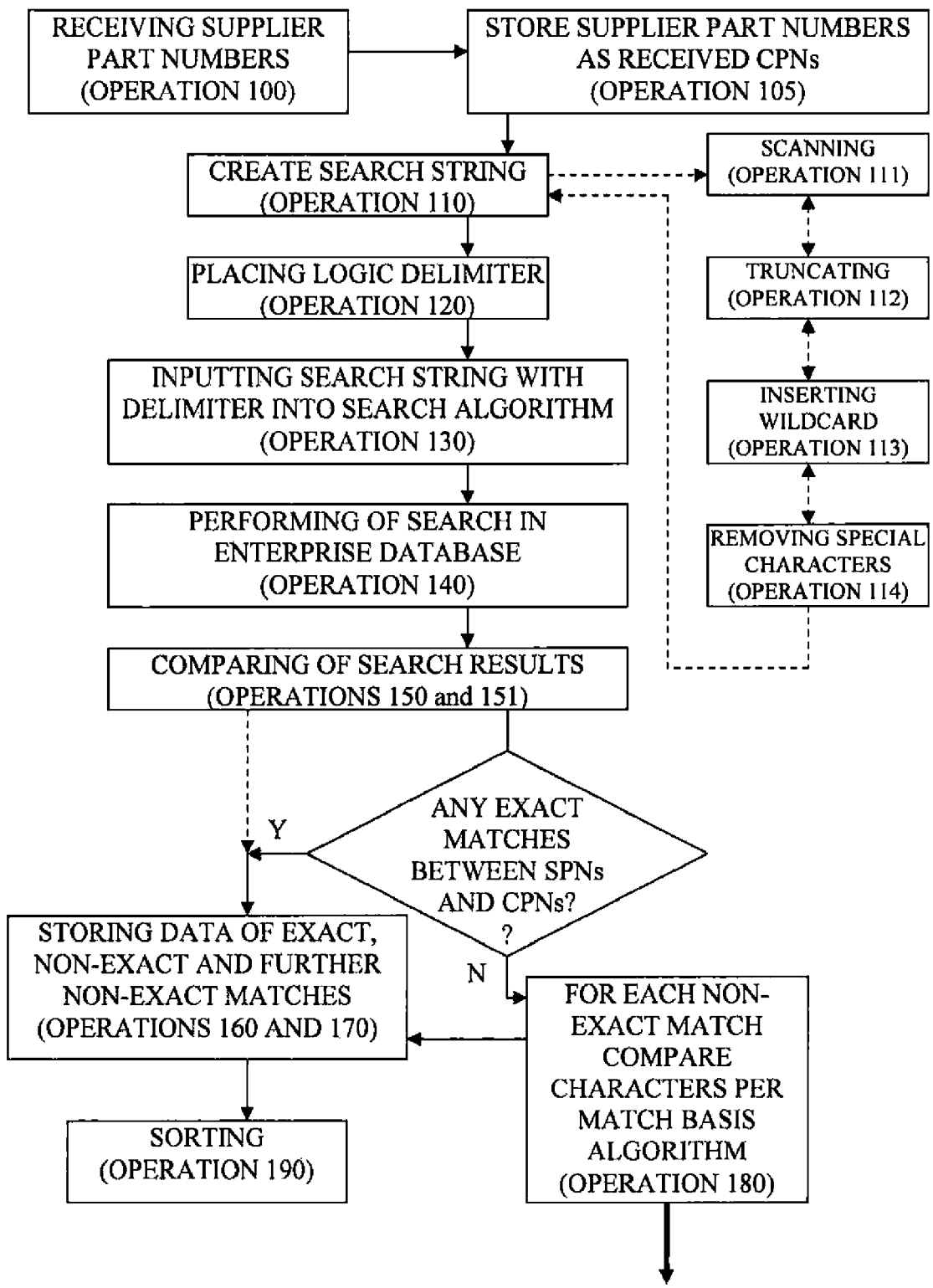
FIG. 2A is a flow diagram illustrating a method in accordance with an exemplary embodiment of the invention.
Figure 2B:
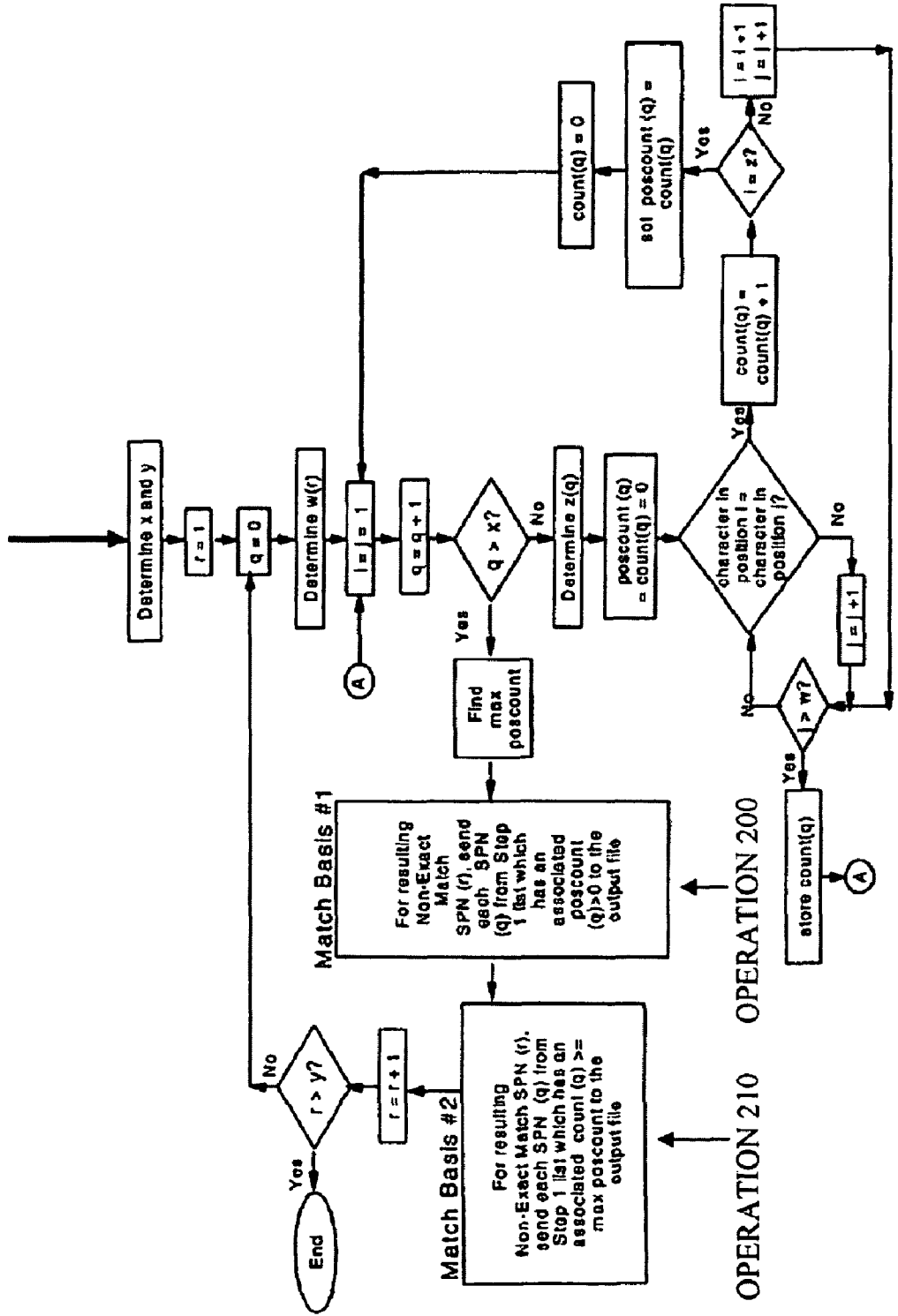
FIG. 2B is a flow diagram illustrating a method of employing a match based algorithm in accordance with an exemplary embodiment of the invention.

With reference to FIGS. 2A and 2B, a method of searching for customer part numbers stored in an enterprise database, in accordance with embodiments of the invention is provided. The method includes receiving supplier part numbers (operation 100) and storing, without any modifications thereto, the customer part numbers (CPNs) (operation 105). The method further includes creating a set of discrete search strings (operation 110) from the supplier part numbers by which a search of the customer part numbers is performed (operations 120, 130 and 140).

The creating of each of the search strings (operation 110) includes scanning each of the supplier part numbers from the left to the right of the supplier part numbers (operation 111) and optionally truncating each of the supplier part numbers at a predetermined position of each (operation 112). Here, the predetermined position of each supplier part number at which the truncating occurs may be a position along the scanning direction of the supplier part number from which a special character is first noticed. Alternatively, the truncating may occur a particular position, or may be progressively adjusted along the search string until a number of identified matches reaches a given value. A wildcard is then inserted before and following each of the supplier part numbers and in between each alpha-numeric character of each of the supplier part numbers (operation 113). The creating of each of the search strings (operation 110) may further be seen as including an operation of removing special characters, such as "!", "/", "#", "–", etc., from the supplier part numbers (operation 114).

It is noted that the performing of the search includes inputting each of the search strings into a search field of a user interface (operation 130) and inputting at least an "OR Logic" delimiter between each of the search strings (operation 120). Here, it is understood that other logic may be inputted to adjust a performance of the search.

The method further includes identifying any exact, non-exact and further non-exact matches between the discrete search strings and the customer part numbers from an output of the search (operations 150-200). Each exact match is characterized by an ordered match of every alpha-numeric and special character of the supplier part numbers with corresponding customer part numbers. Each non-exact match is characterized by a match of each alpha-numeric character of one of the search strings with at least a subset of each alpha-numeric character of one of the customer part numbers. Each further non-exact match is characterized by a match of a subset of each alpha-numeric character of one of the search strings that is at least as long as a maximum length of the search string by which a non-exact match is identified and at least a subset of each alpha-numeric character of one of the customer part numbers. Once found, the exact and the non-exact matches are stored in a search output database (operation 160), and the further non-exact matches are store in another search output database (operation 170). Once stored, all of the matches may be sorted (operation 190), e.g., by a process of alpha-numeric sorting.

In an embodiment of the invention, the search output databases may include the lists 30 and 40 of the exact, non-exact and further non-exact (highly similar) matches. The further non-exact match list may detail the supplier part number(s) that are very similar to the customer's stored part numbers but could not have been used to find the customer's stored part numbers. That is, the further non-exact match list indicates the supplier part numbers that are highly similar to the part numbers in the customer's enterprise database and, accordingly, represent parts that should be reviewed in view of the supplier's communication. In addition, the lists 30 and 40 of the exact and the non-exact matches may provide additional information such as the customer part number (if it is different), the current relevant inventory, the price and/or cost, and the part number attributes.

The identifying of the exact and non-exact matches may include comparing each of the alpha-numeric characters of each of the search strings with at least the subset of the alpha-numeric characters of each of the customer part numbers (operation 150). Similarly, the identifying of the further non-exact matches may include comparing a subset of each of the alpha-numeric characters of each of the search strings that is at least as long as the maximum length of the search string with at least the subset of the alpha-numeric characters of each of the customer part numbers (operation 151).

In more detail, the comparing may include comparing the characters of the search strings with the characters of the part number in accordance with a match basis algorithm (operation 180). The match basis algorithm includes match basis algorithm #1 (operation 200) and match basis algorithm #2 (operation 210) and is detailed in FIG. 2B, where x=a number of supplier part number (SPNs), q=a counter for x SPNs, y=a number of non-exact match SPNs, r=a counter for y non-exact match SPNs. Further, as shown, i=a character position for SPN (q) j=a character position for non-exact match SPN (r). Finally, as shown, z(q)=a number of characters contained within SPN (q) and w(r)=a number of characters contained within the non-exact match SPN (r).

With reference to FIGS. 1, 2A and 2B, examples of the operation of the method and the match-basis algorithm according to the present invention will now be provided. As mentioned above, a received supplier list includes supplier part numbers IRF7413P, MAX873BC/D and MAX873BCPA with supplier part number that are found in the enterprise database being IRF7413P and MAX873BCSA-T.

Here, the supplier part number IRF7413P is used to create a search string represented by "*I*R*F*7*4*1*3*P*" where "*" is a wildcard. Since "*I*R*F*7*4*1*3*P*" results in a found supplier part number in the enterprise database of IRF7413P an exact match is recorded as being found.

Further, with respect to match basis algorithm #2 of operation 200, the supplier part number MAX873BC/D is used to create a search string of "*M*A*X*8*7*3*B*C*" where "*" is a wildcard. This search string results in a non-exact match with part number MAX873BCSA-T. The search string "*M*A*X*8*7*3*B*C*" establishes an 8-character count, which in this example is the maximum string length which can be used to find the customer part number MAX873BCSA-T. Based on this 8-character count and in accordance with match basis algorithm #2, a match basis of 8 alpha-numeric character matches between the supplier part number and the customer part number yields the further non-exact supplier part number MAX873BCPA with respect to the customer part number MAX873BCSA-T.

In accordance with another aspect of the invention, it is noted that the methods described above may be applied to any industry, such as retail, wholesale, OEMs, technology, etc. in product/inventory management systems. It is further noted that the methods described above may be embodied as computer-readable media having instructions stored thereon to execute the methods.

Figure 3:
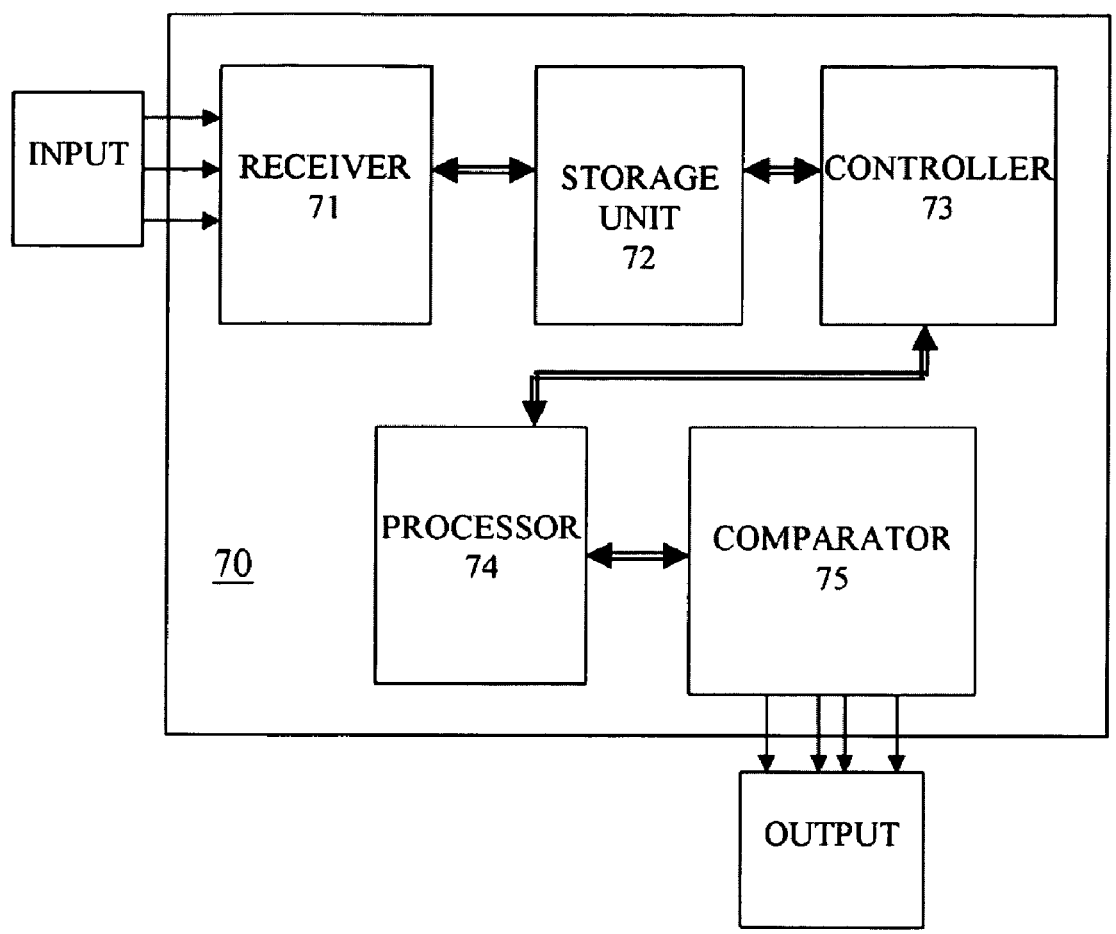
FIG. 3 is a schematic diagram of a system in accordance with an exemplary embodiment of the invention.

With reference to FIG. 3, a system 70 is configured to identify customer part numbers stored in an enterprise database. The system includes a receiver 71 configured to receive a supplier part number, a storage unit 72 configured to store the customer part numbers, a controller 73 configured to create a search string from the supplier part number, a processor 74 configured to conduct a search of the customer part numbers based on the search string, and a comparator 75. The comparator 75 is configured to compare a result of the search with the supplier part numbers so as to identify any exact, non-exact and further non-exact matches between the search string and the customer part numbers. Here, each exact match is characterized by an ordered match of every alpha-numeric and special character of the supplier part numbers with corresponding customer part numbers. Each non-exact match is characterized by a match of each alpha-numeric character of one of the search strings with at least a subset of each alpha-numeric character of one of the customer part numbers. Each further non-exact match is characterized by a match of a subset of each alpha-numeric character of one of the search strings that is at least as long as a maximum length of the search string by which a non-exact match is identified and at least a subset of each alpha-numeric character of one of the customer part numbers. The comparator 75 is further configured to generate an output, such as lists 30 and 40, as described above, which may be reviewed by a user.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A method of searching for customer part numbers stored in a non-transitory computer-readable medium of an enterprise database, comprising:
   identifying any matches between supplier part numbers of a set of supplier part numbers and the customer part numbers;
   creating a set of discrete search strings for each of the supplier part numbers by which a search of the customer part numbers is performed by removing special characters from the supplier part numbers and inserting a wildcard before and following each of the supplier part numbers and in between each alpha-numeric character of each of the supplier part numbers;
   identifying any exact matches and non-exact matches between the discrete search strings and the customer part numbers from an output of the search, each non-exact match being characterized by a match of each alpha-numeric character of one of the search strings with a subset of each alpha-numeric character of one of the customer part numbers;
   determining a maximum length of a search string used to identify each of the non-exact matches; and
   identifying supplier part numbers that are further non-exact matches with respect to the customer part numbers based on the maximum search string length but which could not have been used to identify the customer part numbers.

2. The method according to claim 1, wherein the creating of the set of discrete search strings for each of the supplier part numbers comprises creating a search string, wherein the creating of the search string comprises scanning each of the supplier part numbers from left to right.

3. The method according to claim 2, wherein the creating of the search string further comprises truncating each of the supplier part numbers at a predetermined position of each.

4. The method according to claim 3, wherein the predetermined position of each supplier part number at which the truncating occurs is a position along the scanning direction of the supplier part number from which a special character is removed.

5. The method according to claim 3, wherein the predetermined position is adjustable.

6. The method according to claim 1, wherein the performing of the search comprises:
   inputting each of the search strings into a search field of a user interface; and
   inputting at least an "OR Logic" delimiter between each of the search strings.

7. The method according to claim 1, wherein the performing of the search comprises storing the output of the search in a search output database.

8. The method according to claim 1, wherein the identifying of the non-exact matches comprises comparing each of the alpha-numeric characters of each of the search strings with the subset of the alpha-numeric characters of each of the customer part numbers.

9. The method according to claim 1, wherein the identifying of the further non-exact matches comprises comparing the subset of each alpha-numeric character of the one of the search strings that is at least as long as the maximum length of the search string with at least the subset of the alpha-numeric characters of each of the customer part numbers.

10. The method according to claim 1, further comprising sorting each of the exact, non-exact and further non-exact matches.

11. The method according to claim 10, wherein the sorting comprises alpha-numerical sorting.

12. A non-transitory computer-readable medium having instructions stored thereon to execute the method according to claim 1.

13. A method of searching for customer part numbers stored in an enterprise database, the method comprising:
   creating a set of discrete search strings from a set of supplier part numbers by which a search of the customer part numbers is performed by removing special characters from the supplier part numbers and inserting a wildcard before and following each of the supplier part numbers and in between each alpha-numeric character of each of the supplier part numbers;
   identifying any exact matches and non-exact matches between a particular search string and the customer part numbers from an output of the search, each non-exact match being characterized by a match of each alpha-numeric character of the particular search string with at least a subset of each alpha-numeric character of one of the customer part numbers;
   identifying a maximum length of the particular search string by which each of the non-exact matches are identified; and
   identifying further non-exact matches between the particular search string and the customer part numbers from an output of the search which are at least as long as the maximum length of the particular search string by which each of the non-exact matches are identified but which could not have been used to identify the customer part numbers.

14. The method according to claim 13, further comprising truncating the particular search string at a particular position.

15. The method according to claim 13, further comprising progressively truncating the particular search string.

16. A non-transitory computer-readable medium having instructions stored thereon to execute the method according to claim 13.

17. A system configured to identify customer part numbers stored in an enterprise database, the system comprising:
   a receiver configured to receive a supplier part number;
   a storage unit configured to store the customer part numbers;
   a controller configured to create a search string from the supplier part number by removing special characters from the supplier part numbers and inserting a wildcard before and following each of the supplier part numbers and in between each alpha-numeric character of each of the supplier part numbers;
   a processor configured to conduct a search of the customer part numbers based on the search string to identify any exact, non-exact and further non-exact matches between the search string and the customer part numbers, each non-exact match being characterized by a match of each alpha-numeric character of the search string with at least a subset of each alpha-numeric character of one of the customer s art numbers and each further non-exact match bein characterized by a match of a subset of each alpha-numeric character of the search string and at least a subset of each alpha-numeric character of one of the customer part numbers; and
   a comparator configured to compare a result of the search with the supplier part numbers.

18. The system according to claim 17, wherein the comparator is further configured to generate an output including a list of the exact matches, the non-exact matches, and the further non-exact matches.

19. The system according to claim 18, wherein the output further includes additional data associated with the customer part numbers.

* * * * *